United States Patent
Motz et al.

[11] Patent Number: 6,035,577
[45] Date of Patent: Mar. 14, 2000

[54] TEMPORARILY STABILIZED NATURAL TURF

[75] Inventors: Joseph E. Motz; Mark A. Heinlein, both of Cincinnati, Ohio; Steve Linville, Rydal, Ga.

[73] Assignee: Technology Licensing Corp, Cincinnati, Ohio

[21] Appl. No.: 09/205,529

[22] Filed: Dec. 3, 1998

[51] Int. Cl.[7] ............................. A01B 79/00; A01C 29/00
[52] U.S. Cl. ..................... 47/58.1; 47/1.01 R; 47/1.01 F; 428/17; 428/85; 428/92; 428/95
[58] Field of Search ............................... 47/58.1, 1.01 R, 47/1.01 F; 428/17, 85, 92, 95

[56] References Cited

U.S. PATENT DOCUMENTS

| | | |
|---|---|---|
| 2,605,589 | 8/1952 | Kuestner . |
| 3,513,062 | 5/1970 | Vinicki . |
| 3,845,584 | 11/1974 | Mercer . |
| 3,866,388 | 2/1975 | Loads . |
| 3,995,079 | 11/1976 | Haas, Jr. . |

(List continued on next page.)

FOREIGN PATENT DOCUMENTS

| | | |
|---|---|---|
| 0174755 | 3/1986 | European Pat. Off. . |
| 0204381 | 12/1986 | European Pat. Off. . |
| 0260769 | 3/1988 | European Pat. Off. . |
| 0263566 | 4/1988 | European Pat. Off. . |
| 0373282 | 6/1990 | European Pat. Off. . |

(List continued on next page.)

OTHER PUBLICATIONS

First Notts Sports Commercially Installed Putting Green Passes All Expectations! . . . VHAF Explained.
Safety Play Systems Inc., *The "Envelope" Base System*, Sep. 10, 1992.
Mike Sorensen, Utah Has A Tough New Turf, Deseret News.
Safety Play Systems Inc., *VHAF Erosion Control Fabric*, Sep. 10, 1992.
Andy Boogaard, Young Utes Will Depend On Home Advantage, The Fresno Bee, Aug. 23, 1995.
2–page English Language Part List for JP07–207614, JP08–228512, JP09–2011127, JP4–24432.
Desso DLW Sports Systems Int., *Grass Master*.
Sportgrass Inc., *Guidelines for Establishment and Maintenance of SportGrass TM Athletic Fields*, Maintenance Manual.
Notts Sports News, Keep Off—Your Feet Are Killing Me!, Notts Sport News, Golf Edition.

(List continued on next page.)

*Primary Examiner*—Leon B. Lankford, Jr.
*Attorney, Agent, or Firm*—Wood, Herron & Evans L.L.P.

[57] ABSTRACT

A temporarily stabilized natural turf conforms to a foundation of uniform or nonuniform topography, for instance a golf course green, and includes a flexible biodegradable primary backing with biodegradable fibers tufted thereto, an upper sand-based fill layer extending above the primary to about the tops of the fibers, and natural grass plants supported within the fill layer. The natural grass plants have blades which extend above the fill layer and the fibers to form a natural grass playing surface. The crowns of the natural grass plants reside just beneath the fill layer. The roots of the natural grass plants extend downwardly through the fill layer and through the root permeable and water permeable primary backing. The stabilized turf is grown at a sod farm and transplanted to the use site, and the primary backing helps to carry the sand-based fill layer. Once installed, the roots grow into the foundation relatively quickly, reducing the time needed to achieve a durable natural turf. Neither the backing nor the fibers impede the natural play characteristics of the natural turf surface. Because the backing and the fibers biodegrade over a period of time, the turf may be aerated.

18 Claims, 1 Drawing Sheet

U.S. PATENT DOCUMENTS

| | | |
|---|---|---|
| 4,023,506 | 5/1977 | Robey . |
| 4,044,179 | 8/1977 | Haas, Jr. . |
| 4,337,283 | 6/1982 | Haas, Jr. . |
| 4,389,435 | 6/1983 | Haas, Jr. . |
| 4,396,653 | 8/1983 | Tomarin . |
| 4,444,815 | 4/1984 | Friedrich . |
| 4,462,184 | 7/1984 | Cunningham . |
| 4,572,700 | 2/1986 | Mantarro et al. . |
| 4,735,825 | 4/1988 | Friedrich . |
| 4,790,691 | 12/1988 | Freed . |
| 4,819,933 | 4/1989 | Armond . |
| 4,867,614 | 9/1989 | Freed . |
| 4,913,596 | 4/1990 | Lambert, III . |
| 4,916,855 | 4/1990 | Halliday et al. . |
| 4,941,282 | 7/1990 | Milstein . |
| 5,014,462 | 5/1991 | Malmgren et al. . |
| 5,205,068 | 4/1993 | Solomou . |
| 5,224,290 | 7/1993 | Molnar et al. . |
| 5,326,192 | 7/1994 | Freed . |
| 5,344,470 | 9/1994 | Molnar et al. . |
| 5,346,514 | 9/1994 | Molnar et al. . |
| 5,397,368 | 3/1995 | Molnar et al. . |
| 5,464,455 | 11/1995 | Molnar . |
| 5,489,317 | 2/1996 | Bergevin . |
| 5,490,351 | 2/1996 | Molnar et al. . |
| 5,507,845 | 4/1996 | Molnar et al. . |
| 5,555,674 | 9/1996 | Molnar et al. . |
| 5,586,408 | 12/1996 | Bergevin . |

FOREIGN PATENT DOCUMENTS

| | | |
|---|---|---|
| 0403008 | 12/1990 | European Pat. Off. . |
| 2333534 | 1/1977 | France . |
| 2556381 | 6/1985 | France . |
| 2522864 | 12/1976 | Germany . |
| 8200994 | 8/1982 | Germany . |
| 8112126 | 10/1982 | Germany . |
| 3703866 | 8/1988 | Germany . |
| 3723364 | 1/1989 | Germany . |
| 53-12742 | 6/1977 | Japan . |
| 59-151813 | 2/1983 | Japan . |
| 4-24432 | 2/1992 | Japan . |
| 7-207614 | 8/1995 | Japan . |
| 8-228512 | 9/1996 | Japan . |
| 9-201127 | 8/1997 | Japan . |
| WO 98/20205 | 5/1998 | WIPO . |
| WO 98/23817 | 6/1998 | WIPO . |

OTHER PUBLICATIONS

Netlon, Netlon Advanced Turf—Where Turf Alone Would Fail, Jan., 1992.
Safety Play Systems, Inc., *Notts Fllm*, Sep. 10, 1992.
Notts Sport News, Notts Sport Grass Reinforcement Passes Tough Scottish Trials, Notts Sports News, Grass Reinforcement Edition, Spring 1990.
Safety Play Systems Inc., *Nottsward*, Sep. 10, 1992.
Plastic Grass, Turf Management, May, 1997.

TEMPORARILY STABILIZED NATURAL TURF

FIELD OF THE INVENTION

This invention relates to stabilized natural turf, and more particularly to a temporary stabilizer suitable for Bentgrass used on newly constructed or renovated golf course greens.

BACKGROUND OF THE INVENTION

In most of North America and in many other parts of the world, golf course greens use a type of grass known as Bentgrass. Bentgrass greens are typically grown by seeding at the site of the golf course, above a foundation or base which usually includes sand as a primary component and has water drainage capability which corresponds to specifications set by quasi-governmental bodies, such as the United States Golfing Association (ISGA). Typical grow-in times for Bentgrass golf course greens over a foundation of this type may vary with climate, but usually take several months. Since premature use of such greens can have serious adverse effects on the development and establishment of the roots for the natural grass plants, it is important that the grown-in Bentgrass have a mature and developed root system prior to use.

It is an objective of this invention to reduce the time needed to achieve a playable but durable golf course green of Bentgrass.

One alternative to growing in a golf course green from seed at the site would be to transplant natural grass from a sod farm. However, a primarily sand-based foundation is typically not cohesive, and therefore when the sod is rolled into rolls at the sod farm, transported and then installed at the site, the handling inevitably results in substantial lost volume for the growth media which supports the roots of the mature natural grass plants. Once installed at the site, the lost sand-based growth media would delay establishment of the roots and adversely effect the durability of the natural grass plants.

Another alternative would be to grow natural grass at a sod farm within a more cohesive-type growth media, which is not sand based, and then to wash the cohesive media from the sod rolls prior to installation at the site. However, the resultant sod rolls would then be relatively light in weight, and it would be difficult to obtain a tight relationship along the edges of adjacently located rolls. Mowing of the installed sod rolls, particularly pivoting of the mower at the end of a row of sod rolls, could tear or displace the turf along these seams.

Also, because virtually no growth media would be planted, or installed, with the sod rolls, the entire root system would have to be reestablished at the site. This represents a further delay in establishing a mature natural turf playing surface with an established root system.

Another possible solution for this dilemma would be to use some type of carrier to support natural grass plants grown thereabove within a layer of sand-based growth media. Applicant is not aware whether this approach has been tried, but suspects that it has not. While this approach would eliminate the problems described above relative to the handling and the transport of a sand-based growth media, this approach would not be conducive to the long-term health of the natural grass plants.

That is, it is well understood among greenskeepers and other caretakers of natural grass fields that to maintain a healthy natural grass golf green or athletic surface, it is necessary to practice a number of well-known turf management principles, including top dressing and aeration of the turf. Top dressing involves applying an additional layer of growth media, such as sand, with a spreader. The application of top dressing minimizes the build-up of organic residue at the surface. Aeration involves extending tines, usually hollow tines, downwardly into the ground to a depth of up to three inches in order to promote drainage, to break up the soil and to avoid too much compaction. With a relatively thin sod grown on a carrier as described above, it would be extremely difficult to aerate through the carrier after installation of the grass. As a result, while this approach would possibly solve one short-term problem with respect to reducing the time for obtaining a mature, natural turf golf course green, it would have long-term adverse effects for the health of the natural grass plants.

It is another object of this invention to reduce the time needed to achieve a playable and durable Bentgrass golf course green, but to do so in a manner which promotes the long-term health of the natural grass plants.

It is still another object of this invention to enhance the durability of a natural turf playing surface, within a relatively short time span, yet at the same time to create no impediments or adverse effects for the natural characteristics of the natural turf surface, or any variations in the use of well-recognized turf management principles, such as aeration and top dressing.

SUMMARY OF THE INVENTION

The present invention achieves the above-stated objectives by using a temporary stabilizer in a natural turf grown at a sod farm, which is then transported and installed at a site of use, such as a golf course green, the temporary stabilizer including a flexible biodegradable primary backing with biodegradable fibers secured thereto, a fill layer of sand-based growth media residing above the backing and natural grass plants supported within the fill layer.

The fill layer supports the roots and crowns of the natural grass plants, and the grass blades of the natural grass plants extend above the fibers and the fill layer to create a natural grass surface. The backing "carries" the natural grass plants and the fill layer. The roots of the natural grass plants extend downwardly through the fill layer and even below the backing, and thus are entangled with the secured fibers and the backing. This creates a unified mass which also tends to hold the fill layer of sand-based growth media in place. The primary backing is root permeable and water permeable.

Because the primary backing and the secured fibers are biodegradable, this stabilizer is only temporary. It degrades over a period of time once installed. This temporary stabilizer facilitates the use of transplanted natural turf from a sod farm for on site use, as at a golf course green. With proper planting and timing of the initial planting of the seeds for the natural grass plants at the sod farm, the overall time needed for achieving a playable and durable natural turf surface, such as a golf course green, can be reduced.

Moreover, because the temporary stabilizer of this invention is conducive to transporting only a relatively thin layer of sand-based growth media with the sod, shipping costs are relatively low. The resultant turf product installed at the site has a well developed root system entangled with the primary backing and the fibers. Because of this entanglement and because the backing carries the sand-based growth media, this product suffers only minimal erosion or loss of growth media in transit to the site. In a sense, the primary backing and the tufted fibers serve as an entangling carrier for securely holding the natural grass plants and the fill layer of sand-based growth media, which support the natural grass plants. Once installed, the stabilized turf of this invention is better able to withstand the immediate rigors of regular mowing and heavy foot traffic.

Additionally, because the stabilizer of this invention is only temporary, i.e., it biodegrades over a predetermined period of time, neither the tufted fibers nor the primary backing impede or interfere in any way with preferable turf management practices, such as top dressing or aerating. Even if the first use of aeration is done while portions of the primary backing are still intact, the composition, the weave and a surface treatment for the backing can be made such that the aeration tines will readily pass through to a level below the primary backing. In one sense, the stabilized natural turf of this invention is temporarily stabilized, because the stabilizer goes away. It remains in place during the most critical phases, namely transport and initial grow-in as establishment of the root system.

According to a preferred embodiment of the invention, a temporary stabilizer includes a homogenous primary backing woven of jute, with biodegradable fibers tufted thereto. The fibers may be of a natural material, such as sisal, or they may be synthetic. The stabilizer is located at a sod farm, and then a fill layer of sand-based growth media is applied over the primary backing, to a depth about equal to the tops of the fibers. Grass seed is then planted in the fill layer.

Once the natural grass plants have matured to a point sufficient for transport, the sod is cut at the sod farm into rolls, and it is then transported to the site of use, where it is installed over a foundation. Because the primary backing carries the sand-based growth media, little or none is lost en route. Also, compared to power washed sod, the stabilized turf of this invention is sufficiently heavier. Thus, it is much better able to withstand mowing, particularly pivoting of the mower. It is also much easier to achieve a tight tuck of the seams along adjacent sod rolls. Typically, the foundation will include a surface layer of sand-based growth media which is consistent in composition with the growth media used at the sod farm.

Once installed at the site, the temporarily stabilized natural turf is periodically watered and mowed to help establish a mature root system. After a period of time sufficient for the roots to take hold within the foundation and after sufficient lateral growth, the temporarily stabilized natural turf of this invention will be ready for use. Since the primary backing and the fibers help to hold the growth media in place during transport and during installation, the installed stabilized turf of this invention experiences minimal, if any, root damage due to loss of growth media during transport. It is therefore better able to withstand typical rigors of use, such as regular mows and heavy foot traffic.

Because the primary backing is biodegradable and relatively flexible, i.e., loosely woven, it readily conforms to the foundation, even if the foundation is an uneven surface, such as a typical golf course green. The primary backing biodegrades, representing no impediment at all to aeration of the green. But even before complete degradation of the primary backing, the structure and composition of the primary backing is such that aeration tines could pass through readily. Moreover, depending upon the climate and the expected schedule for aeration, it may be desirable to apply a Equid secondary to the primary, either on the top or the bottom surfaces, or both. This liquid secondary may include a decomposition agent to affect biodegradation within a desired time period, either accelerating or decelerating the time of substantial biodegradation. The secondary may also include a stabilizing agent, to enhance the structural rigidity of the primary during transport to the sod farm and from the sod farm to the site, or even a growth agent of some type, such as a fertilizer.

Because the fibers secured to the primary backing are also biodegradable, and because they are almost entirely buried within the growth media when the stabilized turf is transported to the site, they do not impede or adversely affect aeration or top dressing, nor the natural play characteristics of the natural turf surface which results from this invention. This is particularly important when the stabilized turf is used as a golf course green. With this invention, the roll of a golf ball is generally affected only by the natural grass blades which extend well above the fibers and the growth media.

These and other features of the invention will be more readily understood in view of the following detailed description of the preferred embodiments and the drawings.

DETAILED DESCRIPTION OF THE PREFERRED EMBODIMENT

The Figures show a preferred embodiment of a temporarily stabilized natural turf 10 according to this invention. This detailed description relates primarily to use of this temporarily stabilized turf 10 in connection with a golf course green 12, but it is to be understood that this temporarily stabilized natural turf 10 would also be suitable for numerous other uses. Also, this invention is particularly suitable for Bentgrass, but other types of natural grass could also be used.

Figure 1:
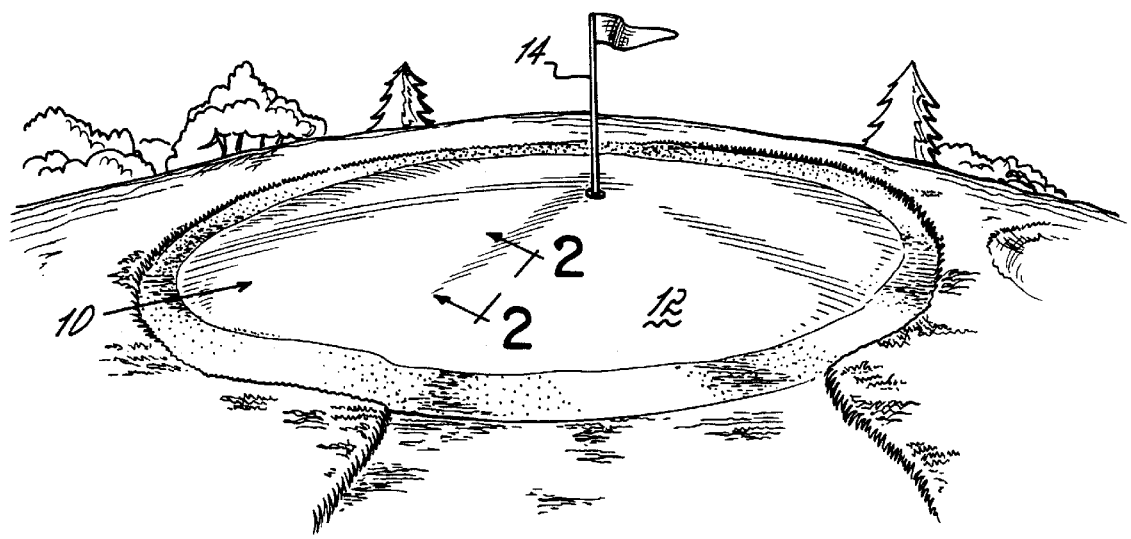
FIG. 1 is a perspective view showing a temporarily stabilized natural turf in accordance with a preferred embodiment of the invention.

As shown in FIG. 1, a temporarily stabilized turf 10 is used to create the natural turf surface of a golf course green 12. FIG. 1 also shows a golf course flag or pin 14. The golf course green 12 typically has a topography which is uneven, although the present invention is equally applicable to topography which is flat.

Figure 2:
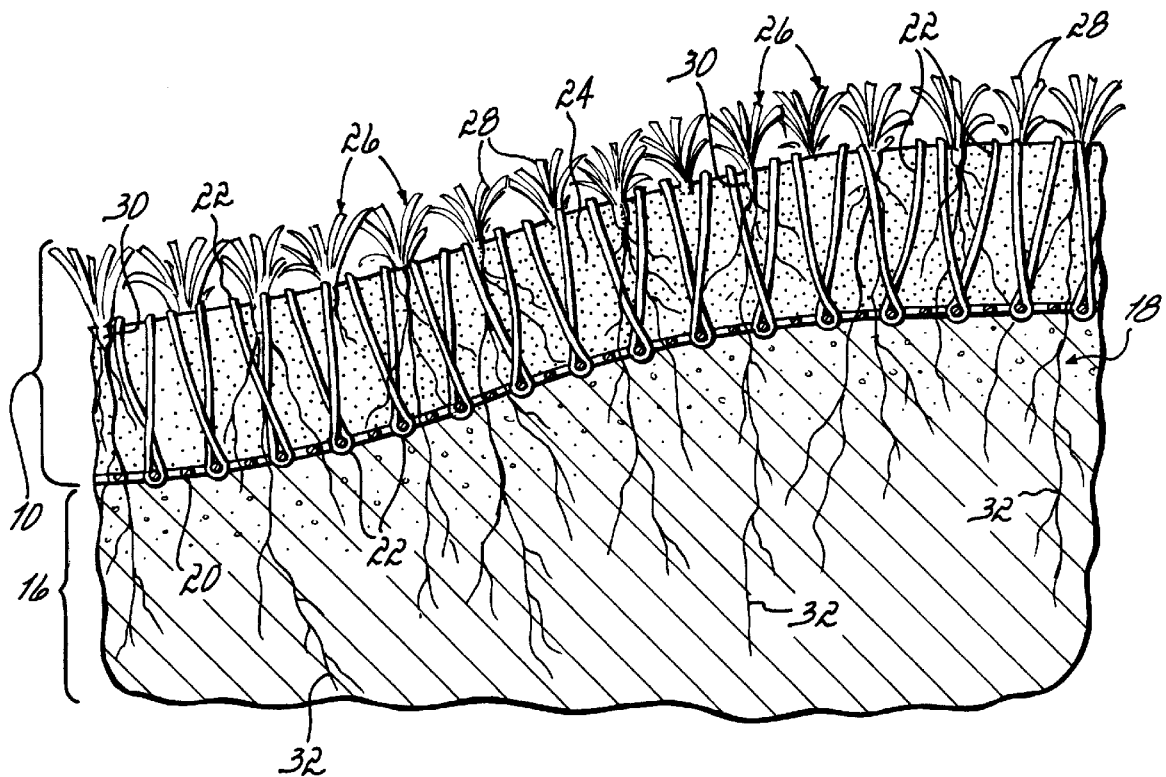
FIG. 2 is a cross-sectional view taken along lines 2—2 of FIG. 1.

FIG. 2 shows in cross-sectional view the temporarily stabilized turf 10 of this invention. More specifically, FIG. 2 shows the underlying foundation 16, which in this case is not level. An upper portion, including the top surface of the base 16, generally includes a fill layer 18 of growth media, which is primarily sand or sand-based. This layer 18 is graded to a desired topography. For a golf green, this topography will typically be uneven and provide "breaks" for the natural turf playing surface. For other types of athletics, the topography may be flat. The word "underlying" is used for this fill layer 18 only to the extent that it eventually resides below the stabilized turf 10, which is transported from the sod farm and is then put in place thereabove. The fill layer 18 is not "underlying" until that installation step occurs.

Above the fill layer 18, the stabilized turf 10 includes a flexible biodegradable primary backing 20. This biodegradable primary backing 20 may be of natural material, such as jute, or it may be of a synthetic biodegradable fiber. A homogenous woven jute primary backing is disclosed in applicant's co-pending U.S. patent application Ser. No. 08/870,541, filed on Jun. 6, 1997, and entitled "STABI- LIZED NATURAL TURF FOR ATHLETIC FIELD" and also in applicant's presently pending patent application PCT Serial No. PCT/US98/11323, filed on Jun. 8, 1998, and bearing the same title, both of which are expressly incorporated by reference herein, in their entireties. The primary backing 20 is made the same way as the primary backing disclosed in these other pending applications. That is, the thickness of the weft and warp fibers and the density of the weave is generally within the same ranges. However, the exact parameters may depend upon a number of considerations, including climate and the amount of time permitted before use.

Biodegradable fibers 22 are secured to the primary backing 20, and extend generally upwardly therefrom. These fibers 22 are preferably made of naturally biodegradable fiber material, such as sisal, or of a synthetic biodegradable material. Preferably, the fibers 22 are tufted to the primary backing 20, although those skilled in the art will recognize that there are numerous other ways of securing the fibers 22 to the backing 20. The fiber height is preferably in the range of about ⅜ inch to ½ inch, and the stitch density for the fibers 22 is preferably in the range of about 5 to 7 per 3 inch length. The primary backing 20 may be biodegradable within the same period of time as the fibers 22, or these time periods may differ.

The primary backing 20 may include a secondary on the top or the bottom surfaces, or on both surfaces. The secondary may be applied as a liquid coating and includes one or more of the following agents: a decomposition agent, a stabilizing agent or a growth agent. According to an alternative, the growth agent may be located in one or both of the fill layers.

An upper fill layer 24 resides above the primary backing 20, and the upper fill layer 24 has a generally uniform vertical depth extending to about the tops of the fibers 22. Because the primary backing 20 flexibly conforms to the topography of the foundation 16, and because the fibers 22 are generally uniform in length and the upper fill layer 24 is generally uniform in depth, the primary backing 20, the fibers 22 and the upper fill layer 24 generally conform to the topography of the foundation 16.

Natural grass plants 26 have natural grass blades 28 which extend upwardly above the upper fill layer 24 and the fibers 22, to form a natural grass surface. The natural grass plants 26 have crowns 30 which reside just below the surface of the upper fill layer 24. The natural grass plants 26 further include roots 32 which extend downwardly from the crowns 30, through the upper fill layer 24, through the root permeable primary backing 20 and into the lower fill layer 18. When the temporarily stabilized turf 10 of this invention is transported to the site of use, the roots 32 are entwined among the fibers 22 and the primary backing 20. After installation, the roots grow further downwardly into the lower fill layer 18. If desired, the fibers 22 may be fibrillated, to further intertwine with the roots 32 of the plants, thereby to enhance the overall stability of the stabilized turf 10 of this invention.

In use, the temporarily stabilized turf 10 of this invention is initially grown at a sod farm. This is done by rolling out widths of the primary backing 20, with the fibers 22 secured thereto. The widths of the rolls may vary, but are typically in the range of about 12 to 15 feet. The upper fill layer of growth media 24 is spread over the primary backing 20, to a uniform depth about equal to the tops of the fibers 22. Preferably, the surface is raked to achieve level and uniform depth of the fill layer 24. Thereafter, Bentgrass grass seed is planted in the upper fill layer 24. After initial growth from the seeds, the natural grass plants 26 eventually develop such that the blades 28 extend upwardly from the fibers 22 and the upper fill layer 24, with the roots 32 extending downwardly to the upper fill layer 24 and downwardly through the primary backing 20.

When the use site is ready for installation of this temporarily stabilized natural turf 10, at the sod farm the roots 32 are cut below the primary 20 to create rolls of temporarily stabilized turf 10. These rolls are transported to the site, and then rolled out into place at the site, typically in parallel rolls. The rolls of stabilized turf 10 will conform to the topography of the foundation 16, so that the blades 28 of the natural grass plants 26 form a natural grass playing surface which generally conforms with the topography of the foundation 16. The weight of the sod rolls helps to enable a tight tuck along the edges, thereby assuring the best possible chance for establishment of a mature root system within the shortest time period. When the stabilized turf 10 is cut at the sod farm to create these rolls, the rolls typically have a width of about 2 feet. When this is done, it is necessary to cut the primary backing 20. At the site, if desired, the installer may secure the primary backings of adjacent rows, either by stapling or stitching, but this is generally not believed to be necessary.

After a sufficient time period of watering and mowing, the roots 32 take hold and become established within the lower fill layer 18, and the natural grass plants 26 also undergo lateral growth along the edges of the sod rolls. Eventually, the grass plants 26 have grown in uniformly across the entire natural turf playing surface, and the athletic surface, in this case a golf green, is ready for use.

Because of the temporary stabilizing effect of the primary backing 20 and the fibers 22, the roots 32 of the natural grass plants 26 will be firmly supported during initial everyday use, including heavy foot traffic and regular mowing. Thus, the stabilizing effect of the primary backing 20 and the fibers 22 improves the durability of the natural turf surface during the most important time periods, at transport and during establishment of the roots. Moreover, because these stabilizing components eventually degrade and go away, they do not represent an agronomic barrier to water flow, nor an impediment to aeration of the green, even when aerating to a depth below the primary backing 20, down into the lower fill layer 18. This is true even before the primary backing 20 completely decomposes, because of the relatively light weight, the flexibility, and the weave density of the backing 20, along with the fact that some biodegradation and loss of structural integrity occurs prior to complete degradation of the backing 20.

While a preferred embodiment of the invention has been described, it will be readily understood by those of ordinary skill in the art that variations may be made thereto without departing from the spirit of the invention. In view of these and other potential variations of the invention, the disclosed preferred embodiment should not be interpreted as restricting or limiting the scope of the following claims.

We claim:

1. A temporarily stabilized turf comprising:
    a foundation including a lower fill layer;
    a biodegradable backing residing over the lower fill layer and substantially conforming thereto, the backing being water permeable and root permeable;
    a plurality of biodegradable fibers extending generally upwardly from the backing;
    an upper fill layer residing over the backing, the upper fill layer having a depth such that the fibers have upper ends extending just above the upper fill layer; and a plurality of natural grass plants supported in the fill layer, the plants having roots extending downwardly through the backing and into the lower fill layer and blades extending upwardly above the top of the fill layer and forming a natural turf playing surface, the backing and the fibers being biodegradable within a predetermined time period to facilitate aeration down to the lower fill layer.

2. The temporarily stabilized turf of claim 1 wherein the backing includes a woven primary backing.

3. The temporarily stabilized turf of claim 2 wherein the woven primary backing is homogenous.

4. The temporarily stabilized turf of claim 3 wherein the woven primary backing comprises jute.

5. The temporarily stabilized turf of claim 1 wherein the backing includes a secondary which incorporates a decomposition agent.

6. The temporarily stabilized turf of claim 1 wherein the biodegradable fibers are made of sisal.

7. The temporarily stabilized turf of claim 1 wherein the biodegradable fibers are tufted to the backing.

8. The temporarily stabilized turf of claim 1 and further including a growth agent incorporated into one of the backing and the fill layer.

9. The temporarily stabilized turf of claim 1 wherein the foundation is topographically uneven and the natural grass is Bentgrass.

10. A mat for temporarily stabilizing a natural turf on a foundation, comprising:

a biodegradable primary backing of sufficient flexibility to substantially conform to the foundation, the primary backing being water permeable and root permeable and biodegradable within a first time period; and a plurality of biodegradable fibers extending upwardly from the backing, the fibers being biodegradable within a second time period.

11. The mat of claim 10 wherein the primary backing comprises jute.

12. The backing of claim 10 wherein the biodegradable fibers are made of sisal.

13. The mat of claim 10 wherein the fibers are tufted to the primary backing.

14. The mat of claim 10 wherein the primary backing is woven.

15. The mat of claim 10 and further including:

a secondary applied to the primary backing, the secondary incorporating a decomposition agent.

16. The mat of claim 10 wherein the first and second time periods have different durations.

17. The mat of claim 16 wherein the first time period is longer than the second time period.

18. A method of creating a temporarily stabilized natural turf comprising:

placing a temporarily stabilized natural turf over a graded foundation so as to be in substantial conformance with the topography of the foundation, the temporarily stabilized natural turf including natural grass plants and a biodegradable primary backing with a plurality of biodegradable fibers extending upwardly from the primary backing, along with a sand-based fill layer extending above the primary backing to a depth just below the tops of the fibers, the natural grass plants having blades extending above the fill layer to form a natural grass athletic surface, crowns residing just below the fill layer and roots extending downwardly from the crowns and through the fill layer and through the primary backing, the biodegradable primary backing and the biodegradable fibers facilitating aeration of the temporarily stabilized natural turf down to a level below the primary backing.

* * * * *